Sept. 25, 1962   J. I. ARGERSINGER ETAL   3,055,181
METHOD OF OPERATING A POWER PLANT SYSTEM
Filed June 23, 1960   2 Sheets-Sheet 2

INVENTORS
John I. Argersinger
Henry J. Blaskowski
BY
Eldon H. Luther
ATTORNEY

United States Patent Office 3,055,181
Patented Sept. 25, 1962

3,055,181
METHOD OF OPERATING A POWER PLANT SYSTEM
John I. Argersinger, Scarsdale, and Henry J. Blaskowski, New York, N.Y., assignors to Combustion Engineering, Inc., New York, N.Y., a corporation of Delaware
Filed June 23, 1960, Ser. No. 38,270
5 Claims. (Cl. 60—73)

This invention relates generally to power plant systems and particularly to systems employing steam generator-steam turbine units for supplying the motive power to operate an electric generator with such systems being in common usage in the utility industry.

At the present time there is an ever-increasing demand in the utility industry for so-called "peaking" steam generators. A peaking steam generator is one that is capable of maintaining a sizable over-capacity for a prolonged period of time, i.e. it is capable of operating substantially above its design or base rating, which is generally referred to as 100% of capacity for a substantial period. The load characteristic of many utility systems is such that as much as 40% or 50% of the maximum continuous demand is required for peaking, with this peaking requirement being needed only 15% to 20% of the time.

The present invention is directed to a power plant system employing a steam generator and more particularly to a method of operating such a power plant system for meeting peaking requirement. In accordance with the invention the power plant system, i.e. the steam generator-turbine unit, is designed for a particular efficiency at base rating. At this rating the steam generator and the turbine operate generally at this design efficiency. The system utilizes the reheat cycle whereby the steam that is exhausted from a high pressure turbine portion, which may be a separate turbine or a high pressure stage of a multi-stage turbine, is conveyed to a reheater that forms part of the steam generator. In the reheater the energy in the steam is increased by raising the temperature of the steam and from the reheater the steam is conveyed to a lower pressure turbine portion, for example, an intermediary pressure turbine or a low pressure turbine depending upon whether there are two or three turbine stages. While the steam generator-turbine unit operates at its design efficiency at the base rating, the unit is capable of providing an output substantially greater than that of the base rating although as the output is increased above the base rating the efficiency of the unit decreases. It is found that this arrangement provides the lowest overall cost per kw. of peak power. This is so because the unit runs at its peaking requirement only 15% to 20% of the time with the unit being operated for much the greater portion of its operating time at the base rating. Accordingly sizing the unit for the base rating gives the greatest overall economy.

In order for the unit to provide the desired efficiency at the base rating the high pressure turbine is designed in such a manner that it receives its volumetric limit of steam at the base rating operation. By this, it is meant that the volume of steam the high pressure turbine receives at the base rating (which is at a particular pressure and temperature) is the maximum volume of steam which this high pressure turbine portion can handle. It could not take a greater quantity (volume) of steam. Accordingly, in order to increase the output of the steam generator-turbine unit above that of the base rating it is not possible merely to generate a greater quantity of steam and pass it through the turbine unit. In accordance with the present invention the power plant system is peaked by generating a greater quantity of steam in the steam generator than is required for the base rating. The pressure, temperature and amount of steam delivered to the high pressure turbine is maintained generally at the same value that is provided for the base rating and the excess steam which issues from the superheater is bypassed around the high pressure turbine. In the preferred embodiment this excess or bypassed steam has its temperature and pressure reduced so that they are generally the same as that of the steam exhausting from the high pressure turbine. This bypassed steam is then introduced or mixed with the exhaust steam from the high pressure turbine and this combined steam flow is passed through the reheater and then through the remaining turbine sections or stages which, of course, operate at a substantially lower pressure than the high pressure turbine state. These low pressure turbine stages are capable of handling a susbtantially greater amount of steam than that which is supplied to them at the base rating of the power plant system.

In lieu of passing the bypassed or excess steam through the reheater together with the exhaust from the high pressure turbine this steam may also bypass the reheater and have its pressure and temperature regulated so that it is the same as the temperature and pressure of the steam issuing from the reheater and introduced into the following turbine stages with this bypassed steam being introduced and passed through these turbine stages or portions along with the steam flow from the reheater.

Accordingly, it is an object of this invention to provide an improved method of operating a power plant system for peaking purposes.

The invention will be more fully understood from the following description when considered in conjunction with the accompanying drawings forming a part thereof and in which.

Figure 1:
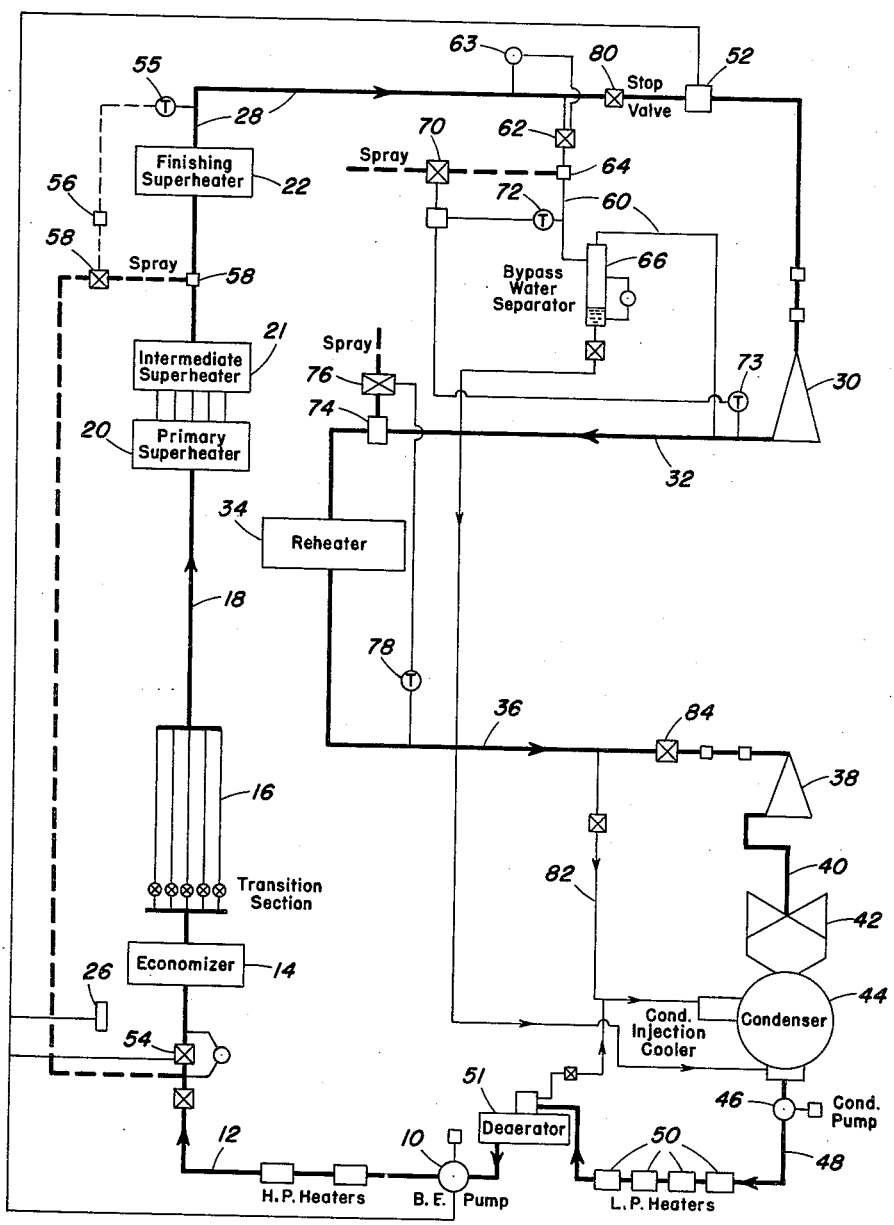
FIG. 1 is a diagrammatic representation in the nature of a flow sheet disclosing a power plant system which may be operated in accordance with the present information.

Referring now to the drawings, in which like reference characters are used throughout to designate like elements, the diagrammatic representation of FIG. 1 discloses a once through steam generator which includes the feed pump 10 which forces water through conduit 12 and into and through economizer 14 and transition section 16. During traversal of this transition section the water is changed to steam and the steam passes therefrom through conduit 18 to the superheater sections 20, 21, and 22, respectively identified as the primary, intermediate, and finishing superheater sections. It will be understood that these various heat exchange sections are mounted in a conventional manner in a steam generator with the tubes lining the walls of the various passages of the steam generator as well as being disposed in the form of sinuous panels in these passages. Heat is imparted to these heat exchange sections by the burning of fuel within the furnace of the steam generator and the passing of the combustion gases thus generated through the passages of the steam generator. In the illustrative organization of FIG. 1 the fuel is diagrammatically indicated as being supplied through burner 26.

The superheated steam leaving super heater section 22 is conveyed through conduit 28 to the high pressure turbine 30. In passing through this turbine, the temperature and pressure of this steam is substantially reduced and the exhaust from this turbine is passed through conduit 32 and reheater 34, which forms a part of the steam generator as is conventional and well known. From reheater 34 the steam, which has its temperature substantially increased by passing through the reheater, is conveyed through conduit 36 to the intermediate pressure turbine 38. This turbine 38 operates at a substantially lower pressure than the high pressure turbine 30 and to illustrate the pressures at which these turbines operate—the high pressure turbine may have an inlet pressure of 3500 lbs. per square inch and an exhaust pressure of 500 lbs. per square inch while the intermediary pressure turbine inlet may have an inlet pressure of 450 lbs. per square inch and outlet pressure of 200 lbs. per square inch. From the intermediate pressure turbine the steam flows through conduit 40 to low pressure turbine 42 with the exhaust from this low pressure turbine being at a high vacuum and leading to condenser 44. Condenser pump 46 pumps the condensate from the condenser through conduit 48 and the several low pressure heaters 50 into the deaerator 51. From the deaerator the water again passes through feed pump 10 and through the entire cycle.

In operation of the unit it is the general practice that the pressure and temperature of the steam delivered to the high pressure turbine 32 and the temperature of the steam delivered to the intermediate pressure turbine 38 are maintained generally constant through the upper portion of the range of operation of the steam generator-turbine unit. To diagrammatically illustrate this, there is shown on FIG. 1 pressure responsive element 52 which may control the firing of the steam generator, the operation of feed water control valve 54 or the feed pump 10 to maintain the pressure constant. There is also diagrammatically shown in this FIG. 1 temperature responsive member 55 which may control valve 56 of the spray type desuperheater 58 to maintain the superheated steam temperature at its desired and generally constant value. It will be understood that these controls are merely diagrammatical representations, with the particular way in which the temperature and pressure of the steam are regulated being of no significant consequence as far as the invention is concerned and with there being several known control systems for effecting the desired control. The important thing, in so far as this invention is concerned, is that the temperature and pressure of the steam delivered to high pressure turbine 30 are controlled to the desired values at full load, and any suitable control arrangement for effecting this result can be employed.

As mentioned previously the steam generator-turbine unit is designed so that it operates at design efficiency at the base rating (full load) and at this rating the amount of steam delivered to the high pressure turbine 30 at the particular pressure and temperature for which the unit is designed is the maximum volume of steam that the high pressure turbine can handle.

In peaking the steam generator-turbine unit of FIG. 1, i.e. in operating it at ratings above the base rating, the amount of steam that is produced by the steam generator is increased, with this being achieved by increasing the firing rate and suitably regulating feed pump 10, feed water control valve 54, and the spray type desuperheater 58 and/or other controls so that a greater volume of steam at generally the same pressure is generated, i.e. more steam at the same pressure issues from superheater 22. Since the steam generator is now generating more steam than required for base rating and the high pressure turbine 30 can handle only the volume of steam at the base rating the excess steam is bypassed around turbine 30 through the bypass line 60. Included in the bypass line is the bypass control valve 62, the desuperheater 64, and the flash tank 66. The operation of the bypass is such that the bypass steam passing through conduit 60 and into conduit 32 is regulated so that its temperature corresponds generally to the temperature of the steam exhausting from high pressure turbine 30 and passing through conduit 32 to reheater 34. The flow of the bypass steam entering conduit 32 is controlled by valve 62 which may be controlled manually or may be provided with automatic control such as pressure responsive element 63. The temperature of the bypassed steam may be regulated by spray type desuperheater 64 which is provided with control valve 70 which in turn, is controlled by temperature responsive element 72 that responds to the temperature of the steam in conduit 60. It is possible with this control to control the temperature of the steam in bypass 60 so it substantially equals the temperature of the exhaust steam from the high pressure turbine 30 because the temperature of this exhaust steam is known and it does not vary appreciably. Therefore the controller for control valve 70 may be set so the temperature responsive element 72 maintains the temperature generally at the value of the known temperature of the exhaust steam from turbine 30. If desired a more refined control arrangement may be employed which utilizes, in addition to temperature responsive element 72, the element 73 which responds to the temperature of the turbine exhaust steam, with these two elements being connected with a suitable control device which in turn regulates the valve 70 in a manner so the bypass and exhaust steam temperatures are the same.

Accordingly the bypass or excess steam is co-mingled or mixed with the exhaust from the high pressure turbine 30 and this mixture is passed through reheater 34 and then passed through turbine sections 38 and 42. The temperature of the steam delivered to turbine 38 is maintained generally constant and this control may be provided by the spray type desuperheater 74 which has its valve 76 controlled by temperature responsive element 78, or the temperature of the reheat steam may be controlled by other suitable means.

While FIG. 1 illustrates a three stage turbine unit the invention is equally applicable to any turbine unit having two or more stages.

From an economic standpoint the invention requires either a natural circulation, controlled circulation or a once through steam generator, which already has a bypass arrangement around the high pressure turbine. It is the practise in once through steam generator systems to provide a bypass around the high pressure turbine for starting purposes and which bypass is open when the unit is first started, with valve 80 then being closed. It is in this starting operation that flash tank 66 finds its purpose with this tank providing for flashing of water to steam upon reducing the pressure thereof and for separating water entrained in steam. It might be mentioned that there is also a bypass 82 around the other turbine stages in a once through unit and which is also open during starting of the unit with valve 84 being closed. The purpose of these bypasses is to prevent the water, which is the state of the fluid throughout the system when it is first started, from passing through the turbines, while at the same time providing a complete path for circulating the water. It is further the practise to provide either natural or controlled circulation steam generators with such a bypass when these generators are to make hot starts, i.e. be restarted only a short time after being shut down. Accordingly, when these systems are started the water and then the steam which is eventually generated in the case of a once through unit and the superheated steam in the case of hot starts is passed through the bypasses until the steam reaches the desired pressure and temperature whereupon the steam is directed to the turbines and the bypasses are closed. Since such a unit will already have a bypass around high pressure turbine 30 this same piping system is utilized with the present invention to bypass the excess steam that is generated for peaking over and above the steam requirement for base rating, thereby providing an extremely efficient, economic arrangement.

While it is preferred to pass the excess steam through the reheater 34 as well as through the other heat exchange surfaces of the steam generator in order that these heat exchange surfaces which have maximum steam flow, thereby assuring adequate cooling of these surfaces, there are instances where it may be desirable to have the excess steam flowing in bypass 30 also bypass reheater 34 with this arrangement providing a reduced pressure drop or friction head.

Figure 2:
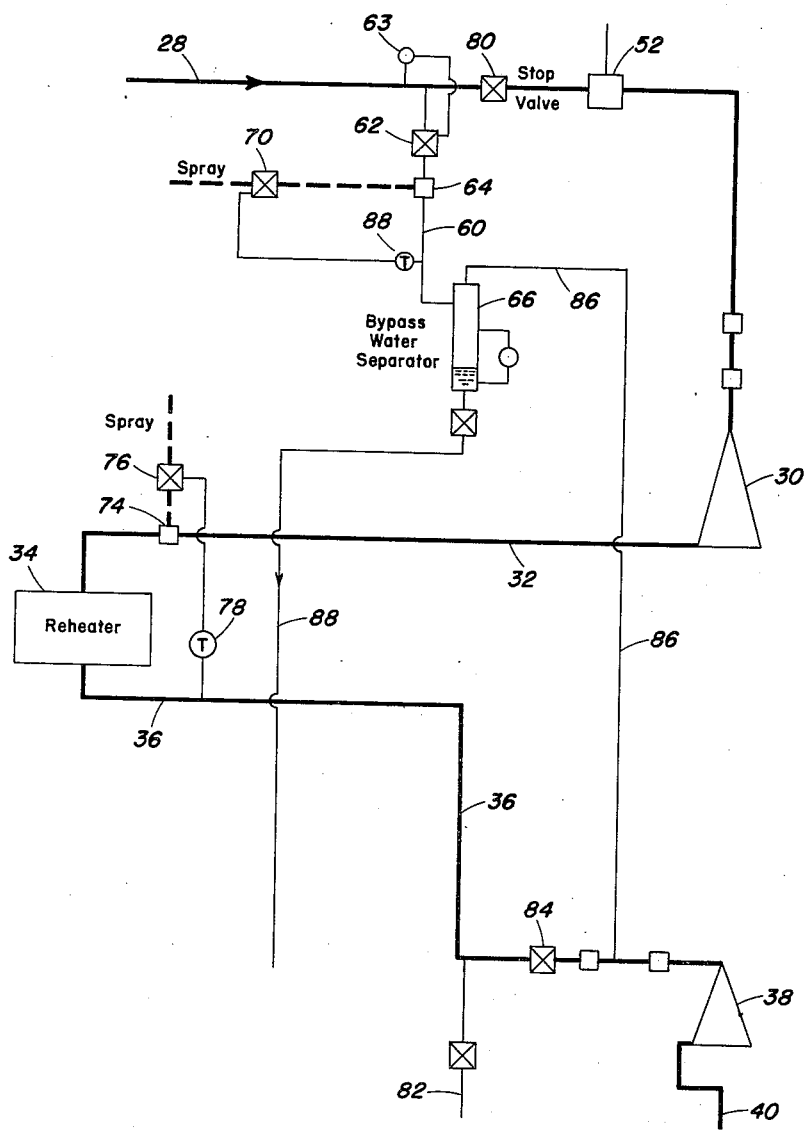
FIG. 2 is a fragmentary view of a portion of the organization of FIG. 1 showing a modified arrangement.

If the reheater is adequately cooled without this excess steam such an arrangement is desirable. The organization of FIG. 2 discloses the system hookup which will then be provided with the bypass conduit 86 connecting with conduit 36 as shown in this modified arrangement. The temperature of the excess steam issuing from conduit 86 into conduit 36 is regulated so that its temperature corresponds generally to that of the steam leaving reheater 34 with temperature responsive element 88 being provided for this purpose and controlling valve 70. The flow is controlled by valve 62 as previously described. It is to be noted that in this modified arrangement there will be little desuperheating via desuperheater 64 required since the temperature of the reheated steam delivered to turbine 38 and the temperature of primary steam delivered to turbine 30 will generally be quite close or may be identical. For example, the primary steam temperature may be 1100° F. and the reheated steam temperature may be 1100° F. or the latter steam temperature may be 1050° F.

It will thus be appreciated that applicant has provided an improved method of peaking a boiler which provides for a highly efficient operation and permits the steam generator-turbine unit to operate at high ratings above the base rating.

It will be understood that the above description is intended for the purpose of illustration only and that modifications such as will occur to those skilled in the art are possible and are embraced within the scope and spirit of the invention.

What is claimed is:

1. In a power plant system operating on the reheat cycle wherein a steam generator supplies superheated steam to the high and the lower pressure portions of a steam turbine unit with a steam bypass being provided around the high pressure turbine portion for starting-up operation and with the high pressure turbine portion receiving its volumetric limit of steam at a predetermined rating of the power plant system, the method of increasing the output of the system for peaking above the predetermined rating comprising increasing the amount of steam generated by the steam generator and issuing from the superheater thereof, maintaining the steam delivery to the high pressure turbine portion substantially at that it receives at said predetermined rating, passing the excess steam through the bypass around the high pressure turbine, reducing the pressure and temperature of this bypass steam generally to that of the steam exhausting from the high pressure turbine, conveying the exhaust steam and the bypass steam through the reheater and then to and through the lower pressure turbine portion.

2. In a power plant system operating on the reheat cycle wherein a steam generator supplies superheated steam to the high and the lower pressure portions of a steam turbine unit with a steam bypass being provided around the high pressure turbine portion for starting-up operation and with the high pressure turbine portion receiving its volumetric limit of steam at the base rating of the power plant system, the method of increasing the output of the system for peaking above the base rating comprising increasing the amount of steam generated by the steam generator and issuing from the superheater thereof, maintaining the steam delivery to the high pressure turbine portion substantially at that it receives at base rating, passing the excess steam through the bypass around the high pressure turbine and passing this excess steam through the lower pressure turbine portion at a pressure and temperature that is generally the same as that of the exhaust steam from the high pressure turbine portion that is also passing through the lower pressure portion.

3. In a power plant system having a steam generator-turbine combination operating on the reheat cycle with the steam generator having a bypass around the high pressure turbine portion for start up purposes, said steam generator having a base rating wherein the high pressure turbine portion receives its volumetric limit of superheated steam at a predetermined pressure and temperature, the method of increasing the output of the system above the base rating comprising increasing the generation of superheated steam above that required for said base rating, maintaining the volume, temperature and pressure of the steam delivered to the high pressure turbine portion generally at the value for base rating, bypassing the high pressure turbine portion with the excess steam, introducing the bypass steam into the next lower pressure turbine portion along with the exhaust steam from the high pressure turbine portion and at generally same temperature and pressure as the exhaust steam.

4. In a power plant system having a steam generator-turbine combination with there being a high pressure turbine portion and a low pressure turbine portion which receives exhaust steam from the high pressure turbine portion, a reheater intermediate said turbine portions for reheating the exhaust steam, and a bypass around the high pressure turbine portion for startup purposes, said steam generator having a base rating wherein the high pressure turbine portion receives its volumetric limit of superheated steam at a predetermined pressure and temperature, the method of increasing the output of the system above the base rating comprising increasing the generation of superheated steam above that required for said base rating, maintaining the volume, temperature and pressure of the steam delivered to the high pressure turbine portion generally at the value for base rating, bypassing the high pressure turbine portion and the reheater with the excess steam, and introducing the bypass steam into said lower pressure turbine portion along with the exhaust steam which has passed through the reheater and at generally the same temperature and pressure as this exhaust steam.

5. In a power plant system having a steam generator-turbine combination operating on the reheat cycle with the steam generator having a bypass around the high pressure turbine portion for start-up purposes, said generator having a base rating wherein the high pressure turbine portion receives its volumetric limit of superheated steam at a predetermined pressure and temperature, the method of increasing the output of the system above the base rating comprising increasing the generation of superheated steam passing through at least a portion of the steam generator above that required for said base rating, bypassing the high pressure turbine portion with the excess steam, introducing the bypass steam into the next lower pressure turbine portion along with the exhaust steam from the high pressure turbine portion and at generally the same temperature and pressure as the exhaust steam.

References Cited in the file of this patent

FOREIGN PATENTS 845,658    France ---------------- May 15, 1939